United States Patent
Bang

(10) Patent No.: US 9,756,161 B2
(45) Date of Patent: Sep. 5, 2017

(54) VOICE RECOGNITION APPARATUS, VEHICLE HAVING THE SAME, AND METHOD OF CONTROLLING THE VEHICLE

(71) Applicants: HYUNDAI MOTOR COMPANY, Seoul (KR); Kia Motors Corporation, Seoul (KR)

(72) Inventor: KyuSeop Bang, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 71 days.

(21) Appl. No.: 14/558,476

(22) Filed: Dec. 2, 2014

(65) Prior Publication Data

US 2016/0057261 A1 Feb. 25, 2016

(30) Foreign Application Priority Data

Aug. 22, 2014 (KR) .................. 10-2014-0109822

(51) Int. Cl.
| | |
|---|---|
| *H04B 1/38* | (2015.01) |
| *H04M 1/27* | (2006.01) |
| *G10L 15/08* | (2006.01) |
| *G10L 15/183* | (2013.01) |
| *H04M 1/60* | (2006.01) |
| *G10L 15/02* | (2006.01) |

(52) U.S. Cl.
CPC ............ *H04M 1/271* (2013.01); *G10L 15/08* (2013.01); *G10L 15/183* (2013.01); *H04M 1/6091* (2013.01); *G10L 2015/027* (2013.01); *H04M 2250/74* (2013.01)

(58) Field of Classification Search
CPC . G10L 15/08; G10L 15/183; G10L 2015/027; H04M 1/271; H04M 1/72519
See application file for complete search history.

(56) References Cited

U.S. PATENT DOCUMENTS

| | | | | |
|---|---|---|---|---|
| 8,589,164 | B1* | 11/2013 | Mengibar | ............... G10L 15/06 704/10 |
| 2009/0043573 | A1* | 2/2009 | Weinberg | .............. H04L 63/302 704/223 |
| 2009/0150156 | A1* | 6/2009 | Kennewick | ........ G06Q 30/0261 704/257 |

(Continued)

FOREIGN PATENT DOCUMENTS

| | | |
|---|---|---|
| JP | 11-65590 A | 3/1999 |
| JP | 11-68920 A | 3/1999 |
| JP | 2000-99084 A | 4/2000 |

(Continued)

OTHER PUBLICATIONS

Korean Office Action issued in Korean Application No. 10-2014-0109822 dated Jul. 16, 2015, with English Translation.

*Primary Examiner* — Xin Jia
(74) *Attorney, Agent, or Firm* — McDermott Will & Emery LLP

(57) ABSTRACT

A voice recognition apparatus including: a context model created by modeling recognition target context; and a voice recognizer configured to create a candidate group corresponding to a received voice signal based on an acoustic model and the context model, and to apply a high reliability weight value to a candidate having a length of syllables corresponding to a length of speech.

26 Claims, 17 Drawing Sheets

(56) References Cited

U.S. PATENT DOCUMENTS

2011/0055256 A1* 3/2011 Phillips .................. G10L 15/30
                                                707/769
2012/0239394 A1* 9/2012 Matsumoto ............ G10L 25/84
                                                704/233

FOREIGN PATENT DOCUMENTS

| JP | 2002-033820 A | 1/2002 |
| JP | 2002-108389 A | 4/2002 |
| KR | 10-2006-0072504 A | 6/2006 |
| KR | 10-2008-0023390 A | 3/2008 |

* cited by examiner

FIG. 15

| LENGTH OF USER'S SPEECH(t) | FIRST WEIGHT VALUE (FIRST CANDIDATE GROUP) | SECOND WEIGHT VALUE (SECOND CANDIDATE GROUP) | THIRD WEIGHT VALUE (THIRD CANDIDATE GROUP) |
|---|---|---|---|
| t < 500ms | 0.8 | 1.2 | 1.1 |
| 500ms < t < 1200ms | 1 | 1 | 1 |
| 1200ms ≤ t | 1.5 | 0.9 | 1 |

FIG. 17

| Category | WHEN WEIGHT VALUES ARE NOT APPLIED | WHEN WEIGHT VALUES ARE APPLIED |
|---|---|---|
| FULL NAME | 98.0 | 99.4 |
| SEGMENTED NAME | 55.4 | 77.8 |
| MONOSYLLABLE NAME | 56.0 | 67.8 |

VOICE RECOGNITION APPARATUS, VEHICLE HAVING THE SAME, AND METHOD OF CONTROLLING THE VEHICLE

CROSS-REFERENCE TO RELATED APPLICATION

This application claims the benefit of Korean Patent Application No. 2014-0109822, filed on Aug. 22, 2014 in the Korean Intellectual Property Office, the disclosure of which is incorporated herein by reference.

BACKGROUND

1. Field

Embodiments of the present disclosure relate to a voice recognition apparatus, a vehicle having the same, and a method of controlling the vehicle.

2. Description of the Related Art

In general, when a driver makes a call with a cellular phone during driving, the driver should perform several operations of pressing buttons while holding the cellular phone with his/her hand, and then putting the cellular phone to his/her ear to speak with the other party.

That is, when a driver makes a call during driving, the driver should take his/her one hand off the steering wheel to hold the cellular phone although the driver should not take both hands off the steering wheel.

In this case, the drivers view may become narrow and thus fail to see pedestrians around the vehicle, a wobble may occur, and response speed for putting on the brakes may also be slow, which leads to an increase of traffic accidents.

In order to overcome these problems, a hands free device or a Bluetooth device has been developed and widely used. The hands free or the Bluetooth device collects a driver's voice to perform voice recognition for communication with the driver, transmits the recognized voice to a cellular phone, and outputs the other party's voice received by the cellular phone through a speaker. However, in order to make or answer a call, the driver must still manually manipulate the cellular phone.

Accordingly, a voice recognition technique for answering a call with voice or making a call to a specific phone number with voice often is applied to a vehicle.

SUMMARY

Therefore, it is an aspect of the present disclosure to provide a voice recognition apparatus for applying reliability weight values according to length of a person's speaking, a vehicle including the voice recognition apparatus, and a method of controlling the vehicle.

Additional aspects of the disclosure will be set forth in part in the description which follows and, in part, will be obvious from the description, or may be learned by practice of the disclosure.

In accordance with one aspect of the present disclosure, a voice recognition apparatus includes: a context model created by modeling recognition target context; and a voice recognizer configured to create a candidate group corresponding to a received voice signal based on an acoustic model and the context model, and to apply a high eliability weight value to a candidate having a length of syllables corresponding to a length of speech.

The voice recognition apparatus may further include a display unit configured to display the candidate group in which one or more candidates are arranged according to degrees of reliability.

The voice recognition apparatus may further include a model creator configured to classify the recognition target context according to a length of syllables, and to create the context model for each length of syllables.

The voice recognizer may create candidate groups for context models created for lengths of syllables, and apply different weight values to the candidate groups, respectively, according to the length of syllables corresponding to the length of speech.

If the length of speech is shorter than or equal to a threshold length, the voice recognizer may apply a high reliability weight value to a candidate corresponding to a length of syllables that is shorter than or equal to a reference length of syllables.

In accordance with another aspect of the present disclosure, a vehicle includes: a context model created by modeling each name included in a phone book; and a voice recognizer configured to create a phone number candidate group corresponding to a received voice signal based on an acoustic model and the context model, and to respectively apply different reliability weight values determined according to a length of speech to phone number candidates in the phone number candidate group.

The vehicle may further include a display unit configured to display the phone number candidate group in which one or more phone number candidates are arranged according to degrees of reliability.

The voice recognizer may apply the reliability weight values such that a phone number candidate having a length of syllables corresponding to the length of speech in the phone number candidate group has a high degree of reliability.

If the length of speech is shorter than a threshold length, the voice recognizer may apply the reliability weight values such that a phone number candidate of a monosyllable in the phone number candidate group has a high degree of reliability.

If the length of speech is longer than a threshold length, the voice recognizer may apply the reliability weight values such that a phone number candidate of a monosyllable in the phone number candidate group has a low degree of reliability.

The vehicle may further include a model creator configured to classify the phone book according to a length of syllables of each name, and to create a context model for each length of syllables.

The model creator may segment the name into a first name and a last name to create a segmented context model.

The model creator may convert the name into phonemes, and model the name in the form of a voice lattice.

The voice recognizer may create a phone number candidate group corresponding to the voice signal from each context model, and apply a high weight value to a phone number candidate group of a length of syllables corresponding to the length of speech.

The voice recognizer may recognize a phoneme string of the voice signal based on the acoustic model, and search for one or more phone number candidates corresponding to the recognized phoneme string in the context model to create the phone number candidate group.

The vehicle may further include a length-of-speech measuring unit configured to detect a Begin of Speech (BoS) and an End of Speech (EoS) from the voice signal, and to measure the length of speech based on the BoS and the EoS.

In accordance with another aspect of the present disclosure, a control method of a vehicle, includes: creating a phone number candidate group corresponding to a received voice signal from a context model created by modeling each name included in a phone book; determining reliability weight values according to a length of a user's speech; and applying the reliability weight values according to lengths of syllables of phone number candidates.

The determining of the reliability weight values may include measuring the length of speech based on a difference between a Begin of Speech (BoS) and an End of Speech (EoS).

The determining of the reliability weight values may include determining the reliability weight values such that a phone number candidate of a length of syllables corresponding to the length of speech has a high degree of reliability.

The determining of the reliability weight values may include determining the reliability weight values such that a phone number candidate of a monosyllable has a high degree of reliability if the length of speech is shorter than or equal to a threshold length.

The determining of the reliability weight values may include determining the reliability weight values such that a phone number candidate of a monosyllable has a low degree of reliability if the length of speech is longer than or equal to a threshold length.

The creating of the phone number candidate group may include: detecting a feature vector from the voice signal; and recognizing a phoneme string of the voice signal from an acoustic model according to the feature vector.

The creating of the phone number candidate group may include creating the phone number candidate group based on a degree of reliability with regard to the phoneme string.

The phone number candidate group may have a degree of reliability that is higher than or equal to predetermined criteria with regard to the phoneme string.

The applying of the reliability weight values may include: arranging one or more phone number candidates of the phone number candidate group according to degrees of reliability; and displaying the phone number candidate group with the phone number candidates arranged according to the degrees of reliability.

The control method may further include: receiving a voice signal according to a users speech; and pre-processing the voice signal.

The control method may further include classifying the phone book according to lengths of names, and creating a context model for each of the lengths of the names.

The creating of the context model may include: converting each name into a phoneme string; and creating a voice lattice based on the phoneme string.

In accordance with another aspect of the present disclosure, a vehicle includes: a plurality of context models created by classifying a phone book according to lengths of names; a candidate group search unit configured to create context candidate groups corresponding to a received voice signal from the respective context models; a weight applying unit configured to apply different reliability weight values to the context candidate groups, respectively, such that a context candidate group created from a context model corresponding to a length of a users speech has a high degree of reliability; and a display unit configured to arrange and display the context candidate groups to which the reliability weight values are applied, according to degrees of reliability.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 15 shows a table listing examples of reliability weight values;

FIG. 17 is a view for describing the improvement of a recognition rate when a phone number is searched by applying reliability weight values according to a length of a speaking person's speech, according to an embodiment of the present disclosure.

DETAILED DESCRIPTION

Figure 1:
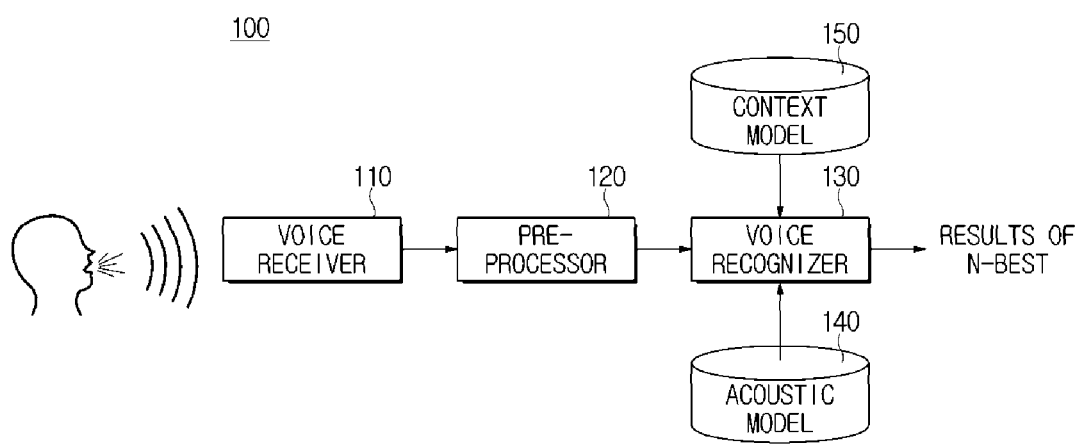
FIG. 1 is a control block diagram of a voice recognition apparatus according to an embodiment of the present disclosure.

Advantages and features of the present disclosure and a method of achieving the advantages and features will be apparent by referring to embodiments described below in connection with the accompanying drawings. However, the present disclosure is not restricted by these embodiments but can be implemented in many different forms. The present embodiments are provided to complete the disclosure of the present invention and to allow those having ordinary skill in the art to understand the scope of the present invention. The present invention is defined by the category of the claims.

Terms used in this specification will be briefly described, and the present disclosure will be described in detail.

Although general terms being widely used at the present disclosure were selected as terminology used in the present disclosure while considering the functions of the present disclosure, they may vary according to intentions of one of ordinary skill in the art, judicial precedents, the advent of new technologies, and the like. Terms arbitrarily selected by the applicant of the present invention may also be used in a specific case. In this case, their meanings need to be given in the detailed description of the present invention. Hence, the terms must be defined based on the meanings of the terms and the contents of the entire specification, not by simply stating the terms themselves.

It will be understood that when the terms "includes," "comprises," "including," and/or "comprising," when used in this specification, specify the presence of stated elements and/or components, but do not preclude the presence or addition of one or more elements and/or components thereof. As used herein, the terms "part", "module", or "unit" refers to a unit that can perform at least one function or operation, and may be implemented as a software or hardware component such as a Field Programmable Gate Array (FPGA) or an Application Specific Integrated Circuit (ASIC), or as a combination of software and hardware. However, the term "part", "module" or "unit" is not limited to software or hardware. The "part", "module", or "unit" may be configured in an addressable storage medium, or may be configured to run on at least one processor. Therefore, as an example, the "part", "module", or "unit" includes: components such as software components, object-oriented software components, class components, and task components; processors, functions, attributes, procedures, sub-routines, segments of program codes, drivers, firmware, microcodes, circuits, data, databases, data structures, tables, arrays, and variables.

Hereinafter, embodiments of the present disclosure will be described in detail with reference to the accompanying drawings so that the present disclosure may be readily implemented by those skilled in the art. In the drawings, parts irrelevant to the description are omitted for the simplicity of explanation.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

As units for recognizing voice, word, syllable, demisyllable, phoneme or phone, diphone, etc. can be used. However, in the following description, for convenience of description, it is assumed that voice is recognized in units of phoneme.

FIG. 1 is a control block diagram of a voice recognition apparatus according to an embodiment of the present disclosure.

Referring to FIG. 1, a voice recognition apparatus 100 according to an embodiment of the present disclosure may include a voice receiver 110, a pre-processor 120, a voice recognizer 130, an acoustic model 140, and a context model 150.

The voice receiver 110 may receive a user's voice, and output a voice signal corresponding to the received voice.

The voice receiver 110 may include voice input means such as a microphone, and an amplifier to amplify sound received by the voice input means.

The pre-processor 120 may pre-process the voice signal for voice recognition. More specifically, the pre-processor 120 may detect a recognition target section from the users voice. For example, the pre-processor 120 may detect a recognition target section from the received voice based on Gaussian modeling.

Also, the pre-processor 120 may remove noise components from a voice signal of the recognition target section. For example, the pre-processor 120 may pass the voice signal through a predetermined fixing filter to remove noise from the voice signal, or may pass the voice signal through a variable filter depending on a change in noise in a peripheral environment to remove noise from the voice signal.

The voice recognizer 130 may recognize the voice based on the acoustic model 140 and the context model 150.

The acoustic model 140 may be created by modeling a feature vector of each phoneme. The acoustic model 140 may be used to determine what phoneme a voice signal corresponds to. That is, the acoustic model 140 may model a feature vector corresponding to each phoneme.

For example, the acoustic model 140 may be configured with a plurality of states that represent voice sections each having acoustically similar features according to a Hidden Markov Model (HMM), and transition probabilities between the states. Also, the acoustic model 140 may be configured according to a temporal arrangement such as Dynamic Time Warping (DTW), or configured with an artificial neural network.

The context model 150 may be created by modeling a voice recognition target, more specifically, by modeling at least one context information which is a voice recognition target. A recognition space may be restricted by the context model 150. As such, by restricting a recognition space, it is possible to limit a space to be searched, which leads to reductions of recognition time and amount of computation and to improvement of voice recognition accuracy.

Herein, the context information means at least one word string which is a voice recognition target. For example, the context model 150 may be modeled in the form of a voice lattice in which phonemes of at least one word string which is a voice recognition target are connected in order. In order to model the context model 150 in the form of a voice lattice, a word string included in the context information may be converted into phonemes according to text-to-phoneme (T2P) conversion or grapheme-to-phoneme (G2P) conversion. The context information may vary depending on the purpose of the voice recognition apparatus 100. For example, the context information may be at least one(s) of words for various control commands, names for searching for phone numbers in a phone book, and names for searching multimedia.

Also, the voice recognizer 130 may measure length of a user's speech, and apply weight values to candidate groups based on the length of speech to recognize the users voice. Hereinafter, operations of the voice recognizer 130 will be described in detail with reference to FIG. 2.

Figure 2:
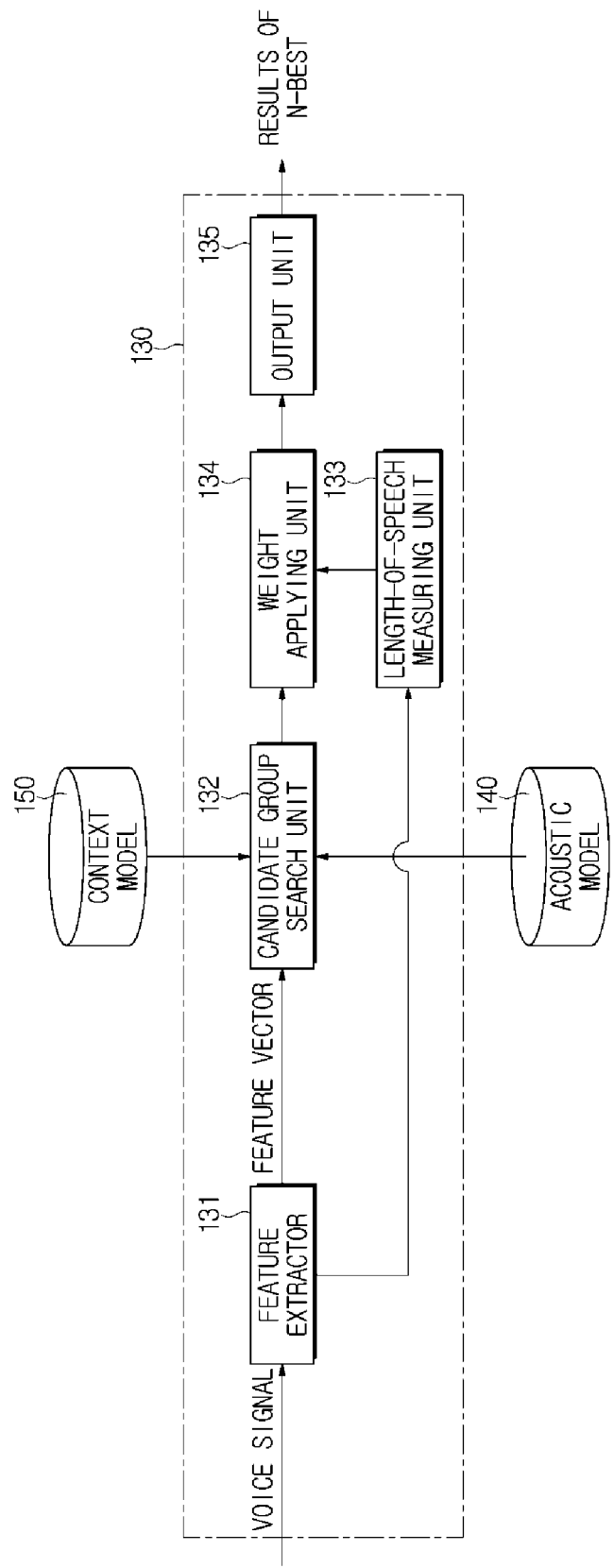
FIG. 2 is a control block diagram of a voice recognizer of a voice recognition apparatus according to an embodiment of the present disclosure.

FIG. 2 is a control block diagram of the voice recognizer 130 of the voice recognition apparatus 100 according to an embodiment of the present disclosure.

Referring to FIG. 2, the voice recognizer 130 may include a feature extractor 131, a candidate group searching unit 132, a length-of-speech measuring unit 133, a weight applying unit 134, and an output unit 135.

The feature extractor 131 may extract a signal feature from a voice signal. Since voice changes depending on the genders, ages, pronunciations, etc. of persons that utter the voice although they use the same language, and depending on whether the voice is pronounced alone or in a word or a sentence, it is necessary to detect a feature capable of sufficiently representing such features of voice.

Therefore, the feature extractor 131 may extract a feature vector from the voice signal in order to remove unnecessarily overlapping voice signals, and to increase discrimination between different voice signals while increasing consistency between the same voice signals.

For example, the feature extractor 131 may extract a feature vector from the pre-processed voice signal, using a linear predictive coefficient, Cepstrum, a Mel Frequency Cepstral Coefficient (MFCC), Filter Bank Energy, etc.

The candidate group searching unit 132 may create a candidate group corresponding to the voice signal based on the acoustic model 140 and the context model 150.

More specifically, the candidate group searching unit 132 may recognize a phoneme string corresponding to the voice signal from the acoustic model 140, according to the feature vector extracted by the feature extractor 131. As described above, since the acoustic model 140 has been modeled by a feature vector (or a group of feature vectors) corresponding to each phoneme, the candidate group searching unit 132 may compare the feature vector extracted by the feature extractor 131 to the acoustic model 140 to recognize a phoneme string corresponding to the voice signal.

The candidate group searching unit 132 may create a candidate group by searching for candidates in the context model 150 based on the phoneme string. More specifically, the candidate group searching unit 132 may compare the phoneme string to the context model 150 to search for candidates having high degrees of reliability in the context model 150, thus creating a candidate group.

The candidate model 150 may be modeled in the form of a voice lattice, as described above. Therefore, the candidate group searching unit 132 may pattern-match the phoneme string corresponding to the input voice signal with the voice lattice of the context model 150 to calculate a degree of reliability between a voice lattice of each recognition target context and the phoneme string.

That is, as the voice lattice is more similar to the phoneme string, a higher degree of reliability is determined, and as the voice lattice is more dissimilar to the phoneme string, a lower degree of reliability is determined.

In more detail, the candidate group searching unit 132 may perform an N-best search to create a candidate group. More specifically, the candidate group searching unit 132 may search for N candidates having highest degree of reliability in the context model 150 to create a candidate group. For example, the candidate group searching unit 132 may select 5 candidates having highest degree of reliability to create a candidate group.

The length-of-speech measuring unit 133 may measure length of a users speech. More specifically, the length-of-speech measuring unit 133 may detect a Begin of Speech (BoS) and an End of Speech (EoS), and calculate a difference between the BoS and the EoS to calculate length of a users speech.

The weight applying unit 134 may determine reliability weight values that are to be applied to the candidate group, based on the length of speech measured by the length-of-speech measuring unit 133. More specifically, the weight applying unit 134 may determine reliability weight values such that a candidate having a length of syllables corresponding to the length of speech among the candidates included in the candidate group has a high degree of reliability.

A length of a users speech is generally proportional to a length of syllables. For example, a speech length of a monosyllable is generally shorter than a speech length of three syllables. Therefore, by measuring length of a user's speech and applying a greater reliability weight value to a candidate having a syllable length with higher probability that is to correspond to the measured length of speech, success rate of voice recognition can increase.

Also, by applying reliability weight values according to length of speech, recognition performance with respect to monosyllables having relatively short syllable lengths can be improved.

Reliability weight values may have been set in advance. The reliability weight values may be set using statistical information on a users speech lengths according to syllable lengths. Also, the reliability weight values may be set based on the length of actual speech from a user that uses the voice recognition apparatus 100.

For example, the voice recognition apparatus 100 (see FIG. 1) may determine reliability weight values based on a relationship between a syllable length of a candidate selected by a user from N-best results provided through recognition on the users language and length of the user's actual speech.

The output unit 135 may rearrange the candidate group to which the reliability weight values have been applied, and output the resultant candidate group. At this time, the output unit 135 may output a context candidate having a highest degree of reliability, or output candidates that are less than N candidates created by the candidate group searching unit 132.

Figure 3:
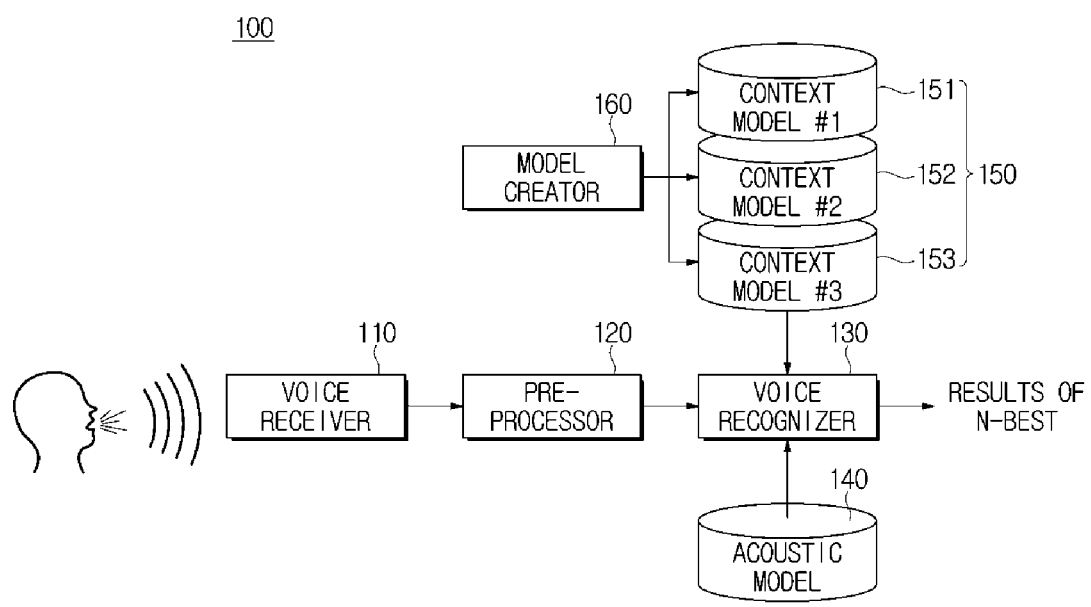
FIG. 3 is a control block diagram of a voice recognition apparatus including a model creator, according to an embodiment of the present disclosure.

FIG. 3 is a control block diagram of the voice recognition apparatus 100 further including a model creator, according to an embodiment of the present disclosure.

Referring to FIG. 3, the voice recognition apparatus 100 may further include a model creator 160. The model creator 160 may model predetermined context information to create a context model 150. The context information may include at least one word string which is a target of a users speech recognition.

For example, the context information may be information required for control by a user's voice, such as the users various control commands, names corresponding to individual phone numbers in a phone book, or a name of at least one multimedia including music or video.

The model creator 160 may convert the context information into phonemes, and connect the phonemes in order to model the context information in the form of a voice lattice. The modeled context information may be searched through pattern-matching with a phoneme string recognized by the acoustic model 140, as described above.

Also, the model creator 160 may convert the context information into phonemes according to various methods. For example, the model creator 160 may convert word strings included in the context information into phonemes according to T2P conversion or G2P conversion.

Also, the model creator 160 may classify the context information according to lengths of word strings to create a plurality of context models.

According to an embodiment, as shown in FIG. 3, the model creator 160 may create three context models (that is, first, second, and third context models 151, 152, and 153) from one context information. The first context model 151 may store a word string that is longer than a threshold length, and the second context model 152 may store a word string that is shorter than the threshold length.

Also, the model creator 160 may divide a word string into word strings having a smaller length to create the third context model 153. For example, the model creator 160 may divide a word string consisting of two words into the two words, and model at least one of the words to create the third context model 153.

The above-description relates to an example in which the model creator 160 classifies and stores context information according to lengths of word strings; however, the model creator 160 may classify context information based on other criteria.

For example, the model creator 160 may classify context information according to syllable lengths of word strings. This will be described in more detail, below.

The voice recognition apparatus 100 may be provided in various electronic apparatuses so that the electronic apparatuses can be driven according to a user's voice. More specifically, the voice recognition apparatus 100 may be applied to a portable electronic device, such as a smart phone, a Portable Media Player (PMP), a Personal Digital Assistant (PDA), or a tablet Personal Computer (PC), or the voice recognition apparatus 100 may be applied to a vehicle 1.

Hereinafter, a vehicle including the voice recognition apparatus 100 will be described in detail with reference to FIGS. 4 to 17.

Figure 4:
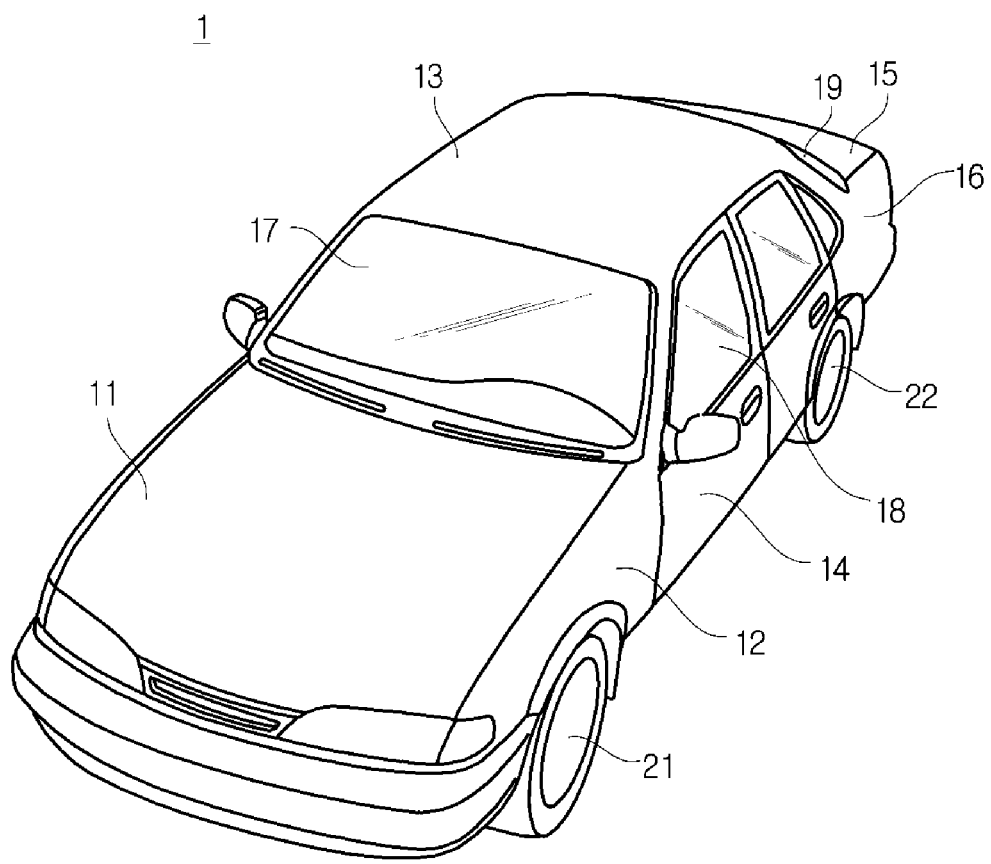
FIG. 4 is a perspective view schematically illustrating an external appearance of a vehicle according to an embodiment of the present disclosure.
Figure 5:
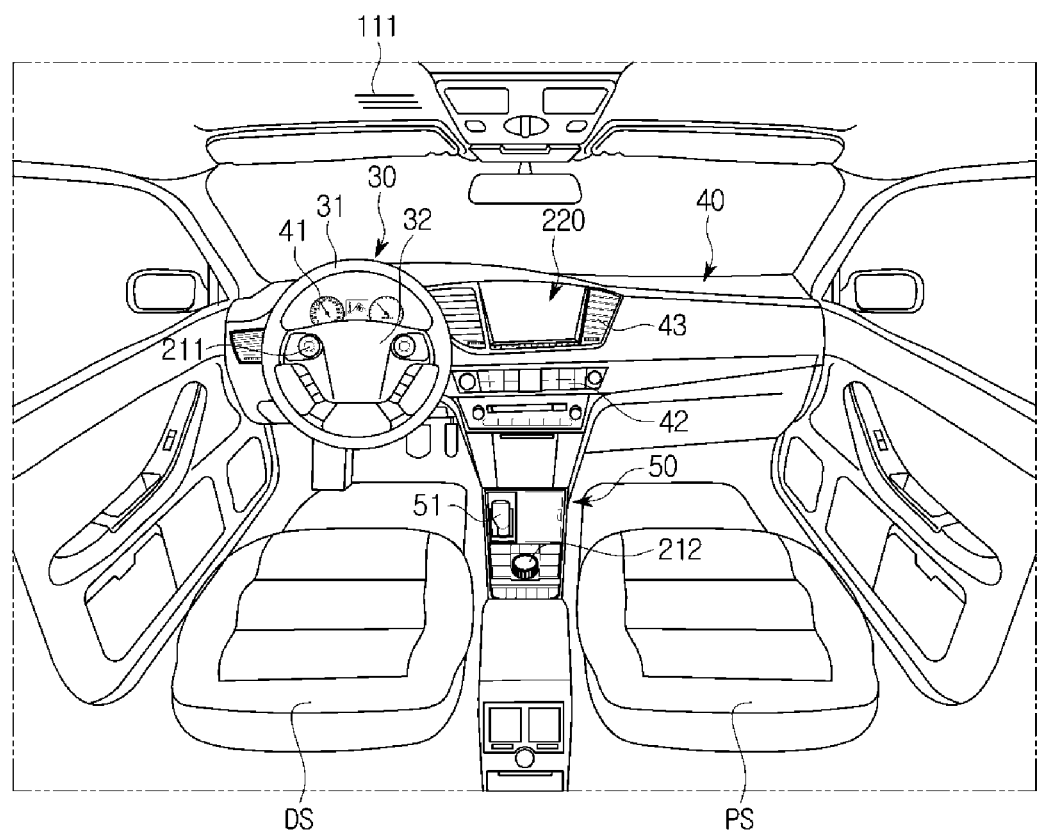
FIG. 5 schematically illustrates the inside of a vehicle according to an embodiment of the present disclosure.

FIG. 4 is a perspective view schematically illustrating an external appearance of a vehicle according to an embodiment of the present disclosure, and FIG. 5 schematically illustrates the inside of a vehicle according to an embodiment of the present disclosure.

Referring to FIGS. 4 and 5, a vehicle 1 may include a vehicle body forming an external appearance of the vehicle 1, and wheels 21 and 22 to move the vehicle 1.

The vehicle body may include a hood 11, front fenders 12, a loop panel 13, doors 14, a trunk rid 15, and quarter panels 16.

Also, the vehicle body may include a front window 17 installed in the front part of the vehicle body to provide a front view of the vehicle 1, side windows 18 installed in the doors 14 to provide rear and side views of the vehicle 1, and a rear window 19 installed in the rear part of the vehicle body to provide a rear view of the vehicle 1.

The wheels 21 and 22 may include front wheels 21 provided in the front part of the vehicle 1, and rear wheels 22 provided in the rear part of the vehicle 1, and the vehicle body can move forward or backward by rotation of the front wheels 21.

In the interior of the vehicle body, seats DS and PS in which passengers sit, a steering wheel 30 to change direction of the vehicle 1, a dash board 40 on which various meters to control operations of the vehicle 1 and to display driving information of the vehicle 1 are installed, and a gear box 50 disposed below the dash board 40 may be provided.

The seats DS and PS may include a driver seat DS in which a driver sits, a passenger seat PS in which a fellow passenger sits, and a back seat (not shown) that is provided in the back part inside the vehicle 1.

The steering wheel 30 may include a rim 31 that is gripped by a driver, and a steering wheel spoke 32 connecting the rim 31 to a hub of a steering apparatus of the vehicle 1 located on a rotation axis for steering. A driver may manipulate the rim 31 to rotate the spoke 32 to change the heading direction of the wheels 21 and 22, thereby adjusting driving direction of the vehicle 1.

Also, the steering wheel 30 may further include a first input unit 211. The driver may input a control command through the first input unit 211. The first input unit 211 may be configured with a scroll wheel, a button, a knob, a touch screen, a touch pad, a lever, a trackball, an operating sensor, or a voice recognition sensor.

The dash board 40 may include an instrument panel 41 to display speed, Revolutions Per Minute (RPM), and fuel gauge of the vehicle 1, a center fascia 42 in which a manipulation unit for controlling an audio system, an air conditioner, or a heater, a ventilator, a cigarette lighter jack, etc. are installed, and a ventilator 43 to inflow air into the vehicle 1.

Below the center fascia 42, a gear box 50 in which a gear apparatus is installed may be provided. A gear handle 51 for changing a gear may protrude from the gear box 50.

Also, the gear box 50 may include a second input unit 212 to enable the driver to input various commands for manipulating various functions of the vehicle 1. The second input unit 212 may include at least one of a knob, a physical button, a joystick, a lever, a trackball, a manipulating wheel, an operating sensor, an object detection sensor, and a touch sensor. Also, the second input unit 212 may include various input means that one of ordinary skill in the art can consider.

Above the driver seat, a microphone 111 may be provided. The microphone 111 may be replaced with any other device that can receive voice and output the received voice as an electrical signal.

Also, the microphone 111 may function as the voice receiver 110 (see FIG. 1), and may be used to collect a driver's voice when a call is made.

Meanwhile, the location of the microphone 111 is not limited to being above the driver seat. For example, the microphone 111 may be provided at any location such as the steering wheel 30, at where a drivers voice can be easily collected.

Figure 6:
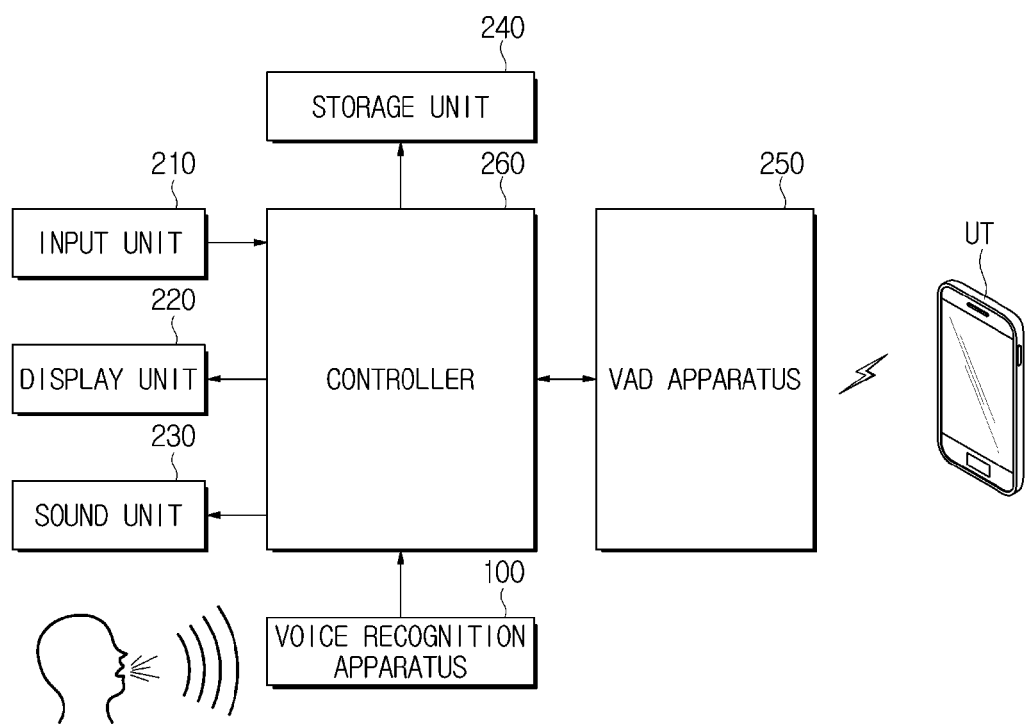
FIG. 6 is a control block diagram of a vehicle including a voice recognition apparatus according to an embodiment of the present disclosure.

FIG. 6 is a control block diagram of the vehicle 1 including the voice recognition apparatus 100 according to an embodiment of the present disclosure.

As shown in FIG. 6, the vehicle 1 may include the voice recognition apparatus 100. Also, the vehicle 1 may include an input unit 210, a display unit 220, a sound unit 230, a storage unit 240, a Voice Activated Dialing (VAD) apparatus 250, and a controller 260 to control overall operations of the vehicle 1.

The voice recognition apparatus 100 may recognize a drivers voice, and transfer the recognized voice to the controller 260 so that the driver can control various functions of the vehicle 1 by voice.

That is, the driver may control various functions of the vehicle 1, for example, a navigation system, an audio system, and a VAD apparatus, using the voice recognition apparatus 100.

Hereinafter, for convenience of description, operations of a VAD apparatus using the voice recognition apparatus 100 will be described in detail, however, the voice recognition apparatus 100 can be used to control various devices of the vehicle 1.

The input unit 210 may receive commands for controlling various functions of the vehicle 1, from a driver. The driver may turn on or off the voice recognition apparatus 100 through the input unit 210, or may make a call to a specific phone number or answer a call using the VAD apparatus 250. For example, the input unit 210 may be the first input unit 211, the second input unit 212, or a touch panel of the display unit 220.

The display unit 220 may provide various information related to the vehicle 1 or a control screen for controlling the vehicle 1. The display unit 220 may be provided in the center of the center fascia 42 to provide the driver with various information, as shown in FIG. 5.

The display unit 220 may be implemented with a Liquid Crystal Display (LCD) panel, a Light Emitting Diode (LED) panel, or an Organic Light Emitting Diode (OLED) panel. Also, the display unit 220 may include a touch panel to receive a user's touch inputs.

The sound unit 230 may output various information related to the vehicle 1 as sound. For example, the sound unit 230 may output the results of sound recognition, or output the other party's voice when a call is made.

Also, the sound unit 230 may output music transmitted from a user terminal UT. The sound unit 230 may be a speaker, and be located in the front or back area inside the vehicle 1.

The storage unit 240 may store data needed for operating various functions of the vehicle 1. For example, the storage unit 240 may store the acoustic model 140 or the context model 150 of the voice recognition apparatus 100 shown in FIG. 1, or store a phone book received from the user terminal UT.

The storage unit 240 may be a non-volatile memory, such as a magnetic disc and a solid state disk, or a volatile memory, such as Dynamic-Random Access Memory (D-RAM) and Static-Random Access Memory (S-RAM), to temporarily store temporary data created when operations of the vehicle 1 are controlled.

The VAD apparatus 250 may control internal devices of the vehicle 1 to enable the driver to make a call without manipulating the user terminal UT. In order to enable the driver to make a call without manipulating the user terminal UT, the VAD apparatus 250 may connect to the user terminal UT, and make or answer a call according to voice recognized by the voice recognition apparatus 100.

The VAD apparatus 250 may connect to the user terminal UT through a wireless communication protocol. For example, the VAD apparatus 250 may connect to the user terminal UT using a short-range communication protocol, such as Bluetooth, Bluetooth low energy, Infrared Data Association (IrDA), Zigbee, Wi-Fi, Wi-Fi direct, Ultra Wideband (UWB), or Near Field Communication (NFC). Hereinafter, operations of the VAD apparatus 250 will be described in detail.

Figure 7:
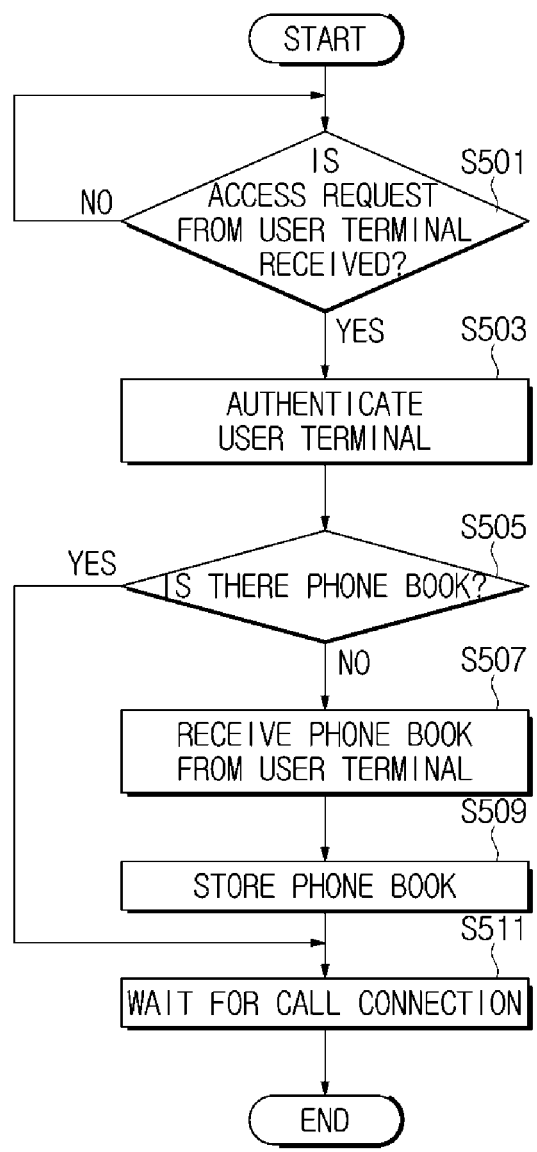
FIG. 7 is a flowchart for describing operation of a Voice Activity Detection (VAD) apparatus of a vehicle according to an embodiment of the present disclosure.
Figure 8:
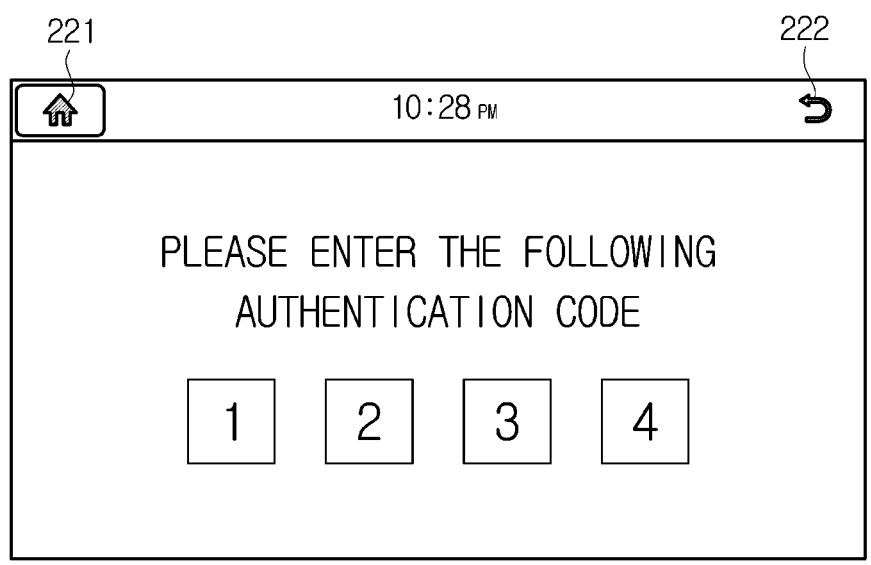
FIG. 8 shows an example of a screen for authenticating a user terminal.

FIG. 7 is a flowchart for describing operation of the VAD apparatus 250 of the vehicle 1 according to an embodiment of the present disclosure, and FIG. 8 shows an example of a screen for authenticating the user terminal UT.

As shown in FIG. 7, the VAD apparatus 250 may determine whether an access request from the user terminal UT is received, in operation S501. The VAD apparatus 250 may connect to the user terminal UT according to a short-range communication protocol, however, a method of connecting the VAD apparatus 250 to the user terminal UT is not limited to the short-range communication protocol.

If the VAD apparatus 250 receives an access request from the user terminal UT, ("Yes" in operation S501), the VAD apparatus 250 may authenticate the user terminal UT, in operation S503. A method of authenticating the user terminal UT is not limited. For example, the VAD apparatus 250 may display a predetermined authentication code through the display unit 220, and determine that the user terminal UT is an authenticated user terminal, if the displayed authenticated code is received by the VAD apparatus 250 after transmitted to the user terminal UT.

More specifically, the controller 260 may control the display unit 220 to display an authentication screen including an authentication code according to a request from the VAD apparatus 250, as shown in FIG. 8. Meanwhile, if the user terminal UT which has requested access to the VAD apparatus 250 is an already authenticated user terminal, operation S503 of authenticating the user terminal UT may be omitted.

Then, the VAD apparatus 250 may determine whether there is a phone book stored therein, in operation S505. More specifically, the VAD apparatus 250 may determine whether the VAD apparatus 250 stores a phone book stored in the user terminal UT.

If the VAD apparatus 250 determines that there is no phone book ("No" in operation S505), the VAD apparatus 250 may receive a phone book from the user terminal UT, in operation S507, and store the received phone book, in operation S509. The received phone book may be stored in the VAD apparatus 250 or the storage unit 240 (see FIG. 6).

Meanwhile, if the VAD apparatus 250 determines that there is a phone book ("Yes" in operation S505), the VAD apparatus 250 may wait for a call connection, in operation (S511).

If the VAD apparatus 250 connects to the user terminal UT, the driver can make a call through the sound unit 230 (see FIG. 6) or the voice receiver 110 (see FIG. 3) installed in the interior of the vehicle 1.

The controller 260 may control overall operations of the vehicle 1. More specifically, the controller 260 may control the voice recognition apparatus 100 and the VAD apparatus 250.

For example, if the controller 260 receives a call from the user terminal UT through the VAD apparatus 250, the controller 260 may notify reception of the call through the sound unit 230, or may search for a phone book corresponding to the results of voice recognition by the voice recognition apparatus 100 and provide the result of the search to the display unit 220 so that the driver can make a call to a desired phone number.

The controller 260 may correspond to one or more processors. The processor may be implemented as an array of a plurality of logic gates, or as a combination of a general-purpose microprocessor and a memory storing a program that can be executed on the microprocessor. However, it will be obvious to one of ordinary skill in the art that the controller 260 can be implemented as a different kind of hardware.

Hereinafter, a method of connecting a call using voice recognition will be described in detail with reference to FIG. 9.

Figure 9:
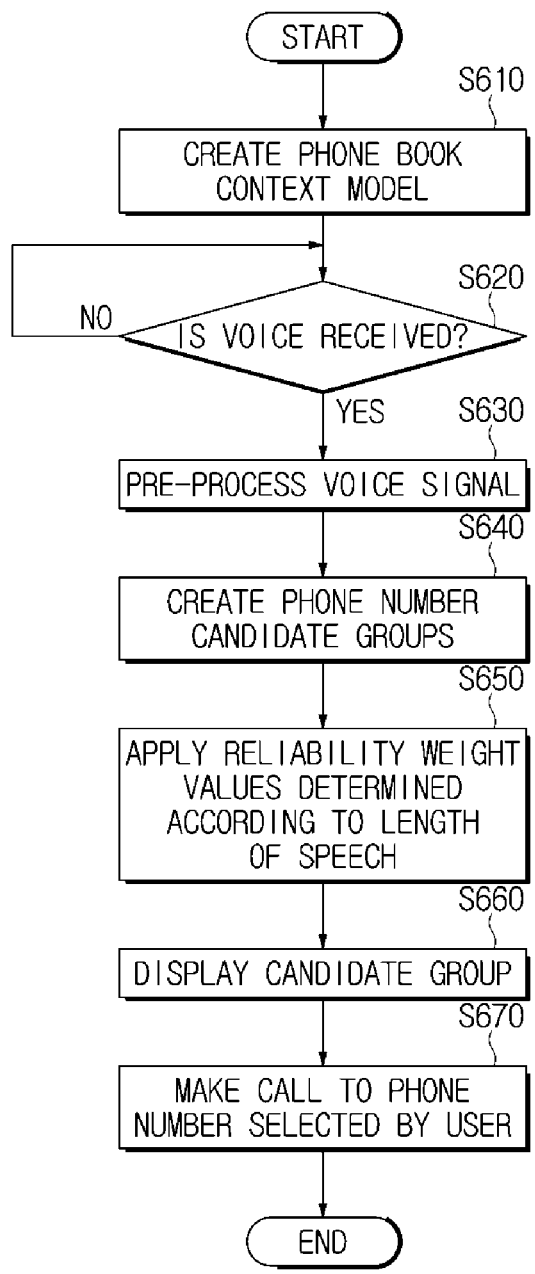
FIG. 9 is a flowchart for describing a call connection through a voice recognition apparatus according to an embodiment of the present disclosure.

FIG. 9 is a flowchart for describing a call connection through the voice recognition apparatus 100 according to an embodiment of the present disclosure.

As shown in FIG. 9, the voice recognition apparatus 100 may create a phone book context model 150 (see FIG. 3), in operation S610. As described above, the voice recognition apparatus 100 may perform voice recognition based on the context model 150 created by modeling a voice recognition target.

Therefore, the voice recognition apparatus 100 may create the phone book context model 150 based on a phone book. Hereinafter, a method of creating the phone book context model 150 will be described in detail.

Figure 10:
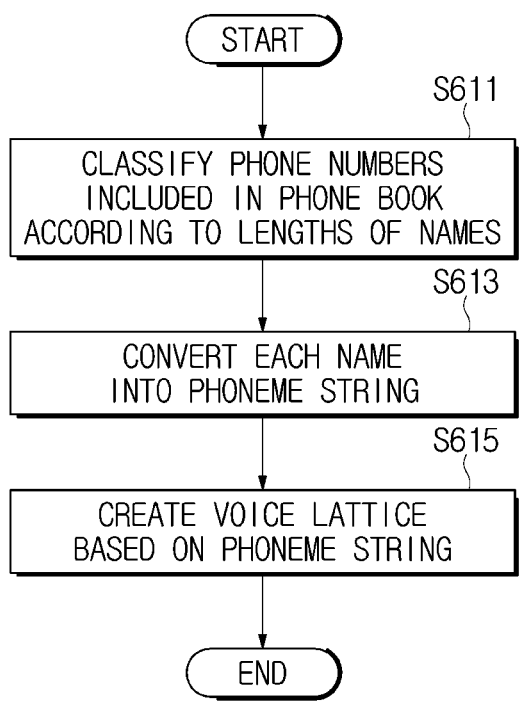
FIG. 10 is a flowchart for describing an example of a method of creating a phone book context model.
Figure 11:
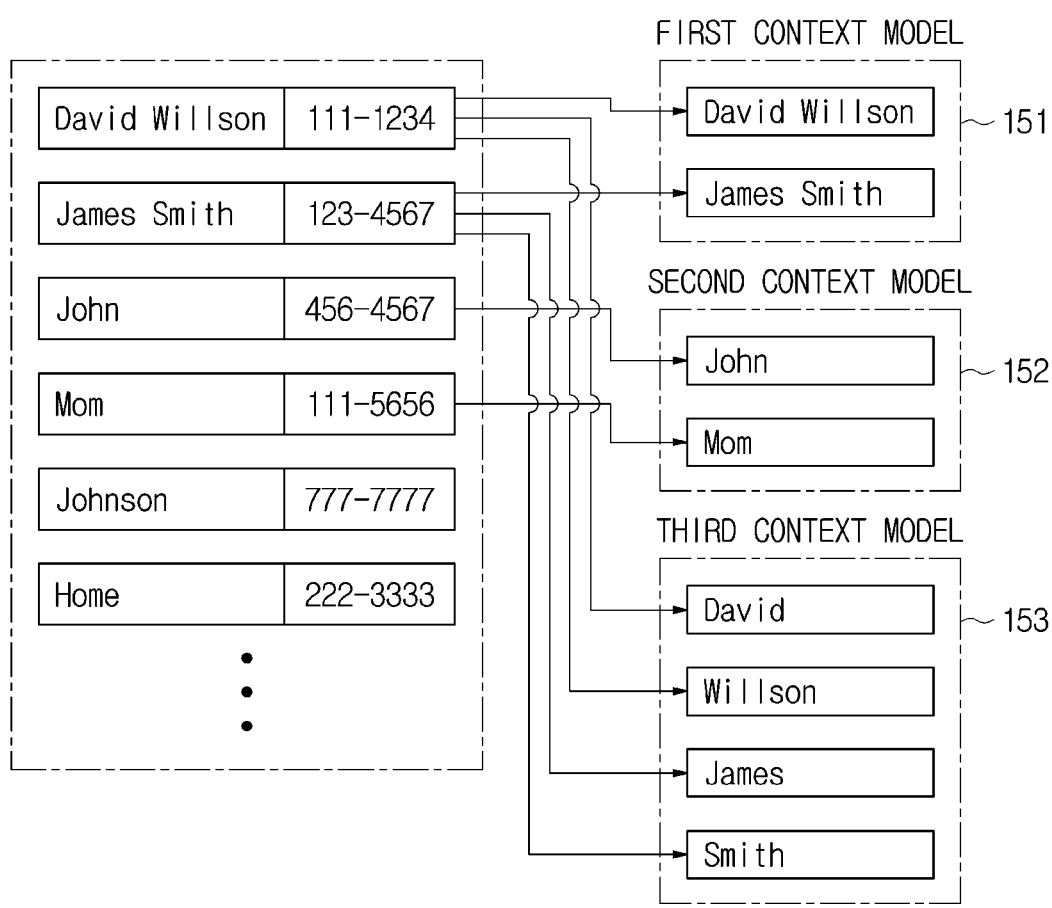
FIG. 11 is a view for describing an example of a method of classifying phone numbers included in a phone book.

FIG. 10 is a flowchart for describing an example of a method of creating the phone book context model 150, and FIG. 11 is a view for describing an example of a method of classifying phone numbers included in a phone book.

Referring to FIGS. 10 and 11, the voice recognition apparatus 100 may classify phone numbers included in a phone book, according to the lengths of names, in operation S611. The length of each name may be at least one of the number of words constituting the name and the number of syllables constituting the name.

As shown in FIG. 11, the phone book may include a plurality of names and a plurality of phone numbers mapped to the respective names. The lengths of the names included in the phone book may be various. For example, the names may be composed of first and last names, such as "David Willson" or "James Smith", may be composed of one of first and last names, such as "John" or "Johnson", or may be a short name, such as "Mom" or "Home".

The voice recognition apparatus 100 may classify the phone book according to the lengths of the names, which match with lengths of speech.

According to an embodiment, the voice recognition apparatus 100 may classify the phone book according to the numbers of word strings included in the names. The voice recognition apparatus 100 may classify "David Willson" or "James Smith" composed of two or more word strings into a first context model 151, and classify "John", "Johnson", "Mom", and "Home" each composed of a single word into a second context model 152.

Also, the voice recognition apparatus 100 may extract each word of a name composed of two or more word strings to configure a third context model 153. That is, if a name is composed of first and last names, the voice recognition apparatus 100 may separate the first name from the last name to create the third context model 153.

Also, the voice recognition apparatus 100 may convert each name into a phoneme string, in operation S613. More specifically, the voice recognition apparatus 100 may convert each name into a phoneme string using T2P conversion or G2P conversion. Herein, the phoneme string may be a group of phonetic symbols of the name.

Then, the voice recognition apparatus 100 may create a voice lattice based on the phoneme string, in operation S615.

According to another embodiment, the voice recognition apparatus 100 may configure a phone book according to a length of syllables of each name.

More specifically, the voice recognition apparatus 100 may convert each name included in the phone book into a phoneme string, count the number of consonants of the phoneme string to calculate a syllable length of the phoneme string, classify the phoneme string according to the syllable length, and then create a voice lattice.

As such, by classifying a phone book according to a syllable length having a high correlation to a length of speech, it is possible to more efficiently apply reliability weight values.

Meanwhile, if there is an already created context model 150, operation 610 of creating the context model 150 may be omitted.

Figure 12:
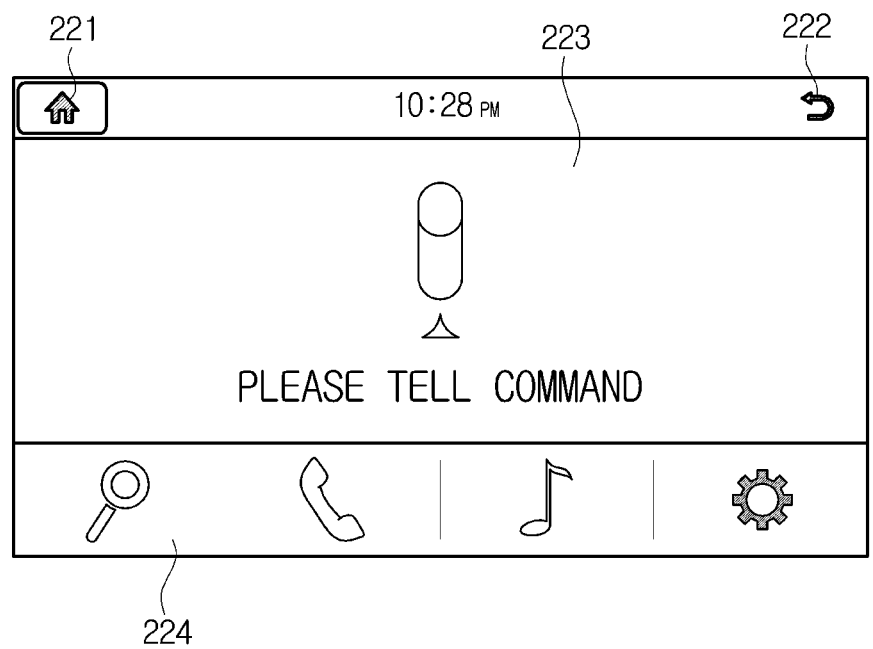
FIG. 12 shows an example of a guide screen for voice recognition.

FIG. 12 shows an example of a guide screen for voice recognition.

Referring again to FIG. 9, the voice recognition apparatus 100 may determine whether voice is received, in operation S620. When determining whether voice is received, the voice recognition apparatus 100 may display a screen informing that a voice recognition function is in an enabled state, as shown in FIG. 12.

More specifically, the display unit 220 (see FIG. 6) may display a home button 221 and a back button 222 in the upper area of a screen, and display an icon list 224 listing icons for executing various functions of the vehicle in the lower area of the screen. Also, in an information display area 223 which is the center of the screen, a guide message that informs the user that the voice recognition function is in an enabled state may be displayed.

If the voice recognition apparatus 100 determines that voice is received ("Yes" in operation S620), the voice recognition apparatus 100 may pre-process the corresponding voice signal, in operation S630. That is, the voice recognition apparatus 100 may detect a recognition target section from the user's voice, or remove noise components from a voice signal of the recognition target section.

Then, the voice recognition apparatus 100 may create phone number candidate groups, in operation S640. Hereinafter, a method of creating the phone number candidate groups will be described in detail with reference to FIG. 13.

Figure 13:
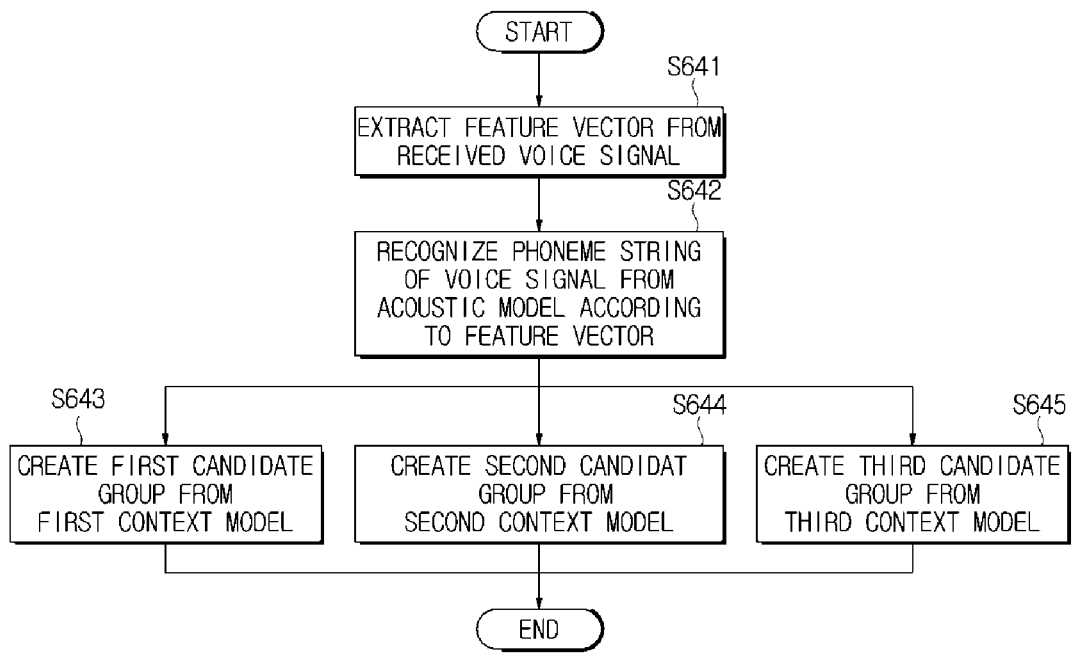
FIG. 13 is a flowchart for describing an example of a method of creating phone number candidate groups.

FIG. 13 is a flowchart for describing an example of a method of creating the phone number candidate groups.

Referring to FIG. 13, the voice recognition apparatus 100 may extract a feature vector from the received voice signal, in operation S641. For example, the voice recognition apparatus 100 may extract a feature vector using a linear predictive coefficient, Cepstrum, a MFCC, filter bank energy, etc.

The voice recognition apparatus 100 may recognize a phoneme string from the acoustic model 140, according to the feature vector, in operation S642. More specifically, the voice recognition apparatus 100 may compare the feature vector extracted from the received voice signal to the acoustic model 140 to recognize a phoneme string corresponding to the received voice signal.

The voice recognition apparatus 100 may create a first candidate group from the first context model 151, in operation S643. More specifically, the voice recognition apparatus 100 may pattern-match a phoneme string corresponding to the received voice signal with a voice lattice of the first context model 151 to create a first candidate group having a predetermined degree of reliability with regard to the phoneme string. Herein, the degree of reliability represents a degree of similarity between the voice lattice and the phoneme string.

The number of candidates that are included in the first candidate group may be set in advance. For example, the voice recognition apparatus 100 may search for N candidates having a highest degree of reliability to create the first candidate group.

Also, voice recognition apparatus 100 may create a first candidate group composed of candidates having a degree of reliability that is higher than a reference degree of reliability.

Also, the voice recognition apparatus 100 may create a second candidate group from the second context model 152, in operation S644, and create a third candidate group from the third context model 153, in operation S645.

Meanwhile, in FIG. 13, an example in which the voice recognition apparatus 100 creates the first to third candidate groups at the same time is shown; however, the voice recognition apparatus 100 may search for the first to third context models 150 sequentially to create the first to third candidate groups sequentially.

Referring again to FIG. 9, the voice recognition apparatus 100 may apply reliability weight values determined according to the length of speech to the candidate groups, in operation S650. Hereinafter, a method of applying reliability weight values will be described in detail, with reference to FIG. 14.

Figure 14:
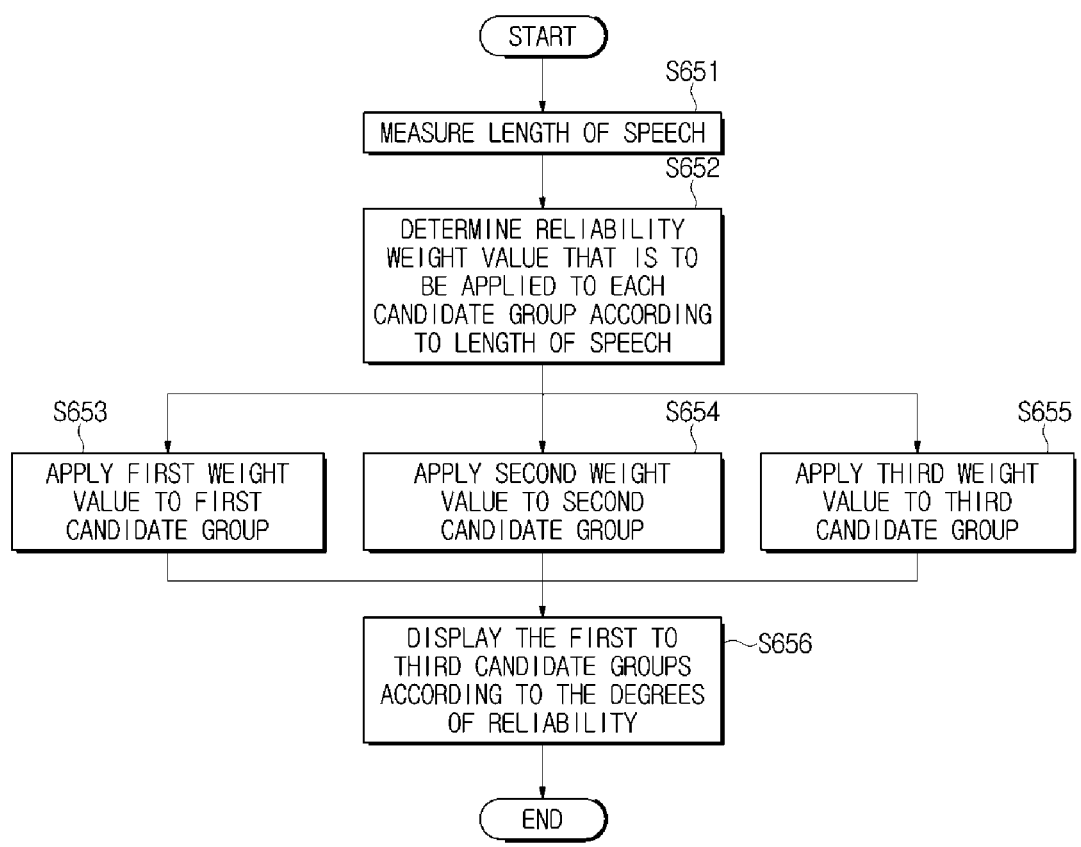
FIG. 14 is a flowchart for describing an example of a method of applying reliability weight values.

FIG. 14 is a flowchart for describing an example of a method of applying reliability weight values, and FIG. 15 shows a table listing examples of reliability weight values.

Referring to FIG. 14, the voice recognition apparatus 100 may measure a length of speech, in operation S651. That is, the voice recognition apparatus 100 may detect a BoS and an EoS, and calculate a difference between the BoS and the EoS to measure length of a users speech.

Then, the voice recognition apparatus 100 may determine reliability weight values that are to be applied to the candidate groups, according to the length of speech, in operation S652. As described, the length of the users speech is generally proportional to length of syllables. Therefore, the voice recognition apparatus 100 may measure length of a user's speech, and determine reliability weight values such that a high reliability weight value is applied to a candidate corresponding to the measured length of speech.

Meanwhile, the first to third candidate groups have been created through classification according to the lengths of names. The voice recognition apparatus 100 may determine reliability weight values that are to be applied to the first to third candidate groups.

For example, as shown in FIG. 14, the voice recognition apparatus 100 may determine reliability weight values of the candidate groups according to length of speech. More specifically, if length of speech is shorter than or equal to 500 ms, the voice recognition apparatus 100 may set a first weight value of the first candidate group corresponding to relatively long names to a small value of e.g., 0.8, and set a second weight value of the second candidate group corresponding to relatively short names to a great value of e.g., 1.2.

Also, if a length of speech is longer than or equal to e.g., 1200 ms, the voice recognition apparatus 100 may set the first weight value of the first candidate group corresponding to the relatively long names to a high value of e.g., 1.5, and set the second weight value of the second candidate group corresponding to the relatively short names to a small value of e.g., 0.9. The reliability weight values may be acquired through big data analysis.

The voice recognition apparatus 100 may apply the reliability weight values to the first to third candidate groups, respectively, in operations S653 to S655. In FIG. 14, an example of applying the reliability weight values to the first to third candidate groups, respectively, at the same time is shown, however, the voice recognition apparatus 100 may apply the reliability weight values to the first to third candidate groups, sequentially.

Referring again to FIG. 9. the voice recognition apparatus 100 may arrange and display the first to third candidate groups according to the degrees of reliability, in operation S656. The voice recognition apparatus 100 may combine the first to third candidate groups to which the reliability weight values have been applied to create a combined candidate group, and arrange the combined candidate group according to the degrees of reliability.

Figure 16:
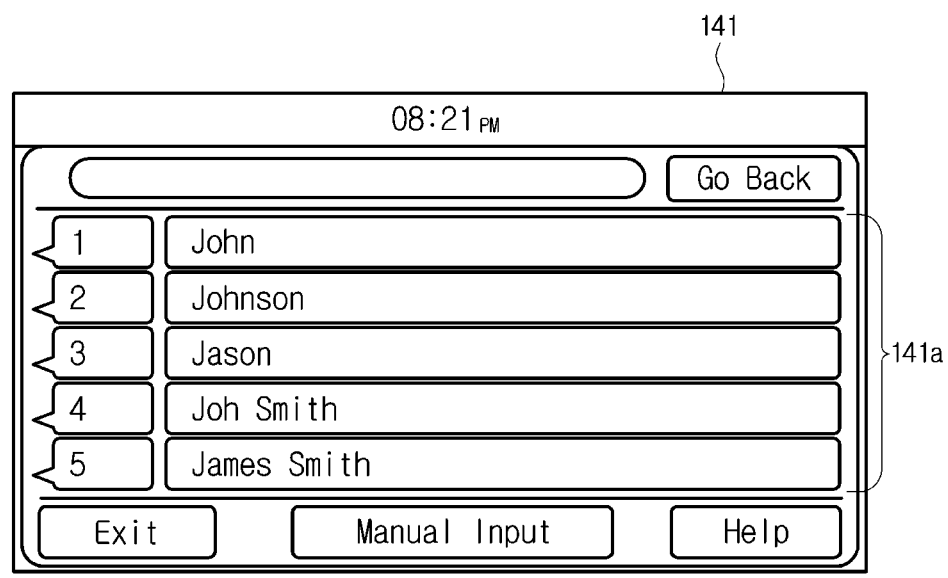
FIG. 16 shows an example of a screen displaying the result of voice recognition.

Then, the voice recognition apparatus 100 may display a candidate having a high degree of reliability in the combined candidate group on the display unit 220. At this time, the candidate displayed on the display unit 220 may be a candidate having a degree of reliability that is higher than predetermined criteria; however, the candidate is not limited to this. For example, as shown in FIG. 16, the voice recognition apparatus 100 may display 5 candidates having a highest degree of reliability found through the N-best search.

Referring again to FIG. 9, the VAD apparatus 250 may make a call to a phone number selected by the user, in operation S670. That is, the VAD apparatus 250 may make a call to a phone number corresponding to a name selected by the user.

FIG. 17 is a view for describing improvement in a recognition rate when a phone number is searched by applying reliability weight values according to length of a speaking person's speech, according to an embodiment of the present disclosure.

FIG. 17 shows the results of voice recognition on 10 speaking persons with respect to a phone book including 1000 phone numbers when an averaged Signal to Noise Ratio (SNR) is 11 db.

As shown in FIG. 17, by applying weight values according to length of speech, a recognition rate of a monosyllable increases by 11% or more, and recognition rate of a segmented name created by segmenting a name into first and last names increases by 55.4%.

Therefore, by providing a voice recognition apparatus using reliability weight values according to length of a person's speech, a vehicle including the voice recognition apparatus, and a method of controlling the vehicle, a voice recognition rate may be improved.

Particularly, a recognition rate of voice such as a monosyllable, which is shorter than a predetermined length, can be improved.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A voice recognition apparatus comprising:
    a context model created by modeling recognition target context;
    a model creator configured to classify the recognition target context according to a length of syllables, and to create a context model for each length of syllables; and
    a voice recognizer configured to create a candidate group corresponding to a received voice signal based on an acoustic model and the context model for each length of syllables, calculate a length of a user's speech based on a Begin of Speech (BoS) and an End of Speech (EoS), and apply a high reliability weight value to a candidate having a length of syllables corresponding to the length of speech.

2. The voice recognition apparatus according to claim 1, further comprising a display unit configured to display the candidate group in which one or more candidates are arranged according to degrees of reliability.

3. The voice recognition apparatus according to claim 1, wherein if the length of speech is shorter than or equal to a threshold length, the voice recognizer applies a high reliability weight value to a candidate corresponding to a length of syllables that is shorter than or equal to a reference length of syllables.

4. The voice recognition apparatus according to claim 1, wherein the voice recognizer creates candidate groups for context models created for lengths of syllables, and applies different weight values to the candidate groups, respectively, according to the length of syllables corresponding to the length of speech.

5. The voice recognition apparatus according to claim 1, wherein the recognition target context is a phone book.

6. A vehicle comprising:
    a context model created by modeling each name included in a phone book;

a model creator configured to classify the phone book according to a length of syllables of each name, and to create a context model for each length of syllables; and a voice recognizer configured to create a phone number candidate group corresponding to a received voice signal based on an acoustic model and the context model for each length of syllables, calculate a length of speech based on a Begin of Speech (BoS) and an End of Speech (EoS), and to respectively apply different reliability weight values determined according to the length of speech to phone number candidates in the phone number candidate group.

7. The vehicle according to claim 6, further comprising a display unit configured to display the phone number candidate group in which one or more phone number candidates are arranged according to degrees of reliability.

8. The vehicle according to claim 6, wherein the voice recognizer applies the reliability weight values such that a phone number candidate having a length of syllables corresponding to the length of speech in the phone number candidate group has a high degree of reliability.

9. The vehicle according to claim 6, wherein if the length of speech is shorter than a threshold length, the voice recognizer applies the reliability weight values such that a phone number candidate of a monosyllable in the phone number candidate group has a high degree of reliability.

10. The vehicle according to claim 6, wherein if the length of speech is longer than a threshold length, the voice recognizer applies the reliability weight values such that a phone number candidate of a monosyllable in the phone number candidate group has a low degree of reliability.

11. The vehicle according to claim 6, wherein the model creator segments the name into a first name and a last name to create a segmented context model.

12. The vehicle according to claim 6, wherein the model creator converts the name into phonemes, and models the name in the form of a voice lattice.

13. The vehicle according to claim 6, wherein the voice recognizer creates a phone number candidate group corresponding to the voice signal from each context model, and applies a high weight value to a phone number candidate group of a length of syllables corresponding to the length of speech.

14. The vehicle according to claim 6, wherein the voice recognizer recognizes a phoneme string of the voice signal based on the acoustic model, and searches for one or more phone number candidates corresponding to the recognized phoneme string in the context model to create the phone number candidate group.

15. The vehicle according to claim 6, further comprising a length-of-speech measuring unit configured to detect a Begin of Speech (BoS) and an End of Speech (EoS) from the voice signal, and to measure the length of speech based on the BoS and the EoS.

16. A control method of a vehicle, comprising:
creating a phone number candidate group corresponding to a received voice signal from a context model created by modeling each name included in a phone book;
classifying the phone book according to lengths of names, and creating a context model for each of the lengths of the names;
calculate a length of speech based on a Begin of Speech (BoS) and an End of Speech (EoS);
determining reliability weight values according to the length of the user's speech; and
applying the reliability weight values according to lengths of syllables of phone number candidates selected from the context model for each of the lengths of the names.

17. The control method according to claim 16, wherein the determining of the reliability weight values comprises measuring the length of speech based on a difference between a Begin of Speech (BoS) and an End of Speech (EoS).

18. The control method according to claim 16, wherein the determining of the reliability weight values comprises determining the reliability weight values such that a phone number candidate of a length of syllables corresponding to the length of speech has a high degree of reliability.

19. The control method according to claim 16, wherein the determining of the reliability weight values comprises determining the reliability weight values such that a phone number candidate of a monosyllable has a high degree of reliability if the length of speech is shorter than or equal to a threshold length.

20. The control method according to claim 16, wherein the determining of the reliability weight values comprises determining the reliability weight values such that a phone number candidate of a monosyllable has a low degree of reliability if the length of speech is longer than or equal to a threshold length.

21. The control method according to claim 16, wherein the creating of the phone number candidate group comprises:
detecting a feature vector from the voice signal; and
recognizing a phoneme string of the voice signal from an acoustic model according to the feature vector.

22. The control method according to claim 21, wherein the creating of the phone number candidate group comprises creating the phone number candidate group based on a degree of reliability with regard to the phoneme string.

23. The control method according to claim 21, wherein the phone number candidate group has a degree of reliability that is higher than or equal to predetermined criteria with regard to the phoneme string.

24. The control method according to claim 16, wherein the applying of the reliability weight values comprises:
arranging one or more phone number candidates of the phone number candidate group according to degrees of reliability; and
displaying the phone number candidate group with the phone number candidates arranged according to the degrees of reliability.

25. The control method according to claim 16, further comprising:
receiving a voice signal according to the user's speech; and
pre-processing the voice signal.

26. The control method according to claim 16, wherein the creating of the context model comprises:
converting each name into a phoneme string; and
creating a voice lattice based on the phoneme string.

* * * * *